United States Patent [19]

Kuwabara

[11] Patent Number: 4,923,245
[45] Date of Patent: May 8, 1990

[54] CEILING STRUCTURE OF MOTOR VEHICLE
[75] Inventor: Akira Kuwabara, Kanagawa, Japan
[73] Assignee: Ikeda Bussan Co., Ltd., Ayase, Japan
[21] Appl. No.: 201,789
[22] Filed: Jun. 2, 1988
[30] Foreign Application Priority Data
Jul. 31, 1987 [JP] Japan .......................... 62-117865[U]
[51] Int. Cl.$^5$ .......................... B60R 13/02; B60J 7/00
[52] U.S. Cl. .................................... 296/214; 296/216; 24/295; 52/511
[58] Field of Search .................. 296/214, 216; 52/511; 24/293, 295

[56] References Cited
U.S. PATENT DOCUMENTS

| 1,760,267 | 5/1930 | Carr | 52/511 |
| 3,216,166 | 11/1965 | Brown | 52/511 |
| 4,718,714 | 1/1988 | Tanino et al. | 296/214 |
| 4,802,707 | 2/1989 | Schlapp | 296/214 |

FOREIGN PATENT DOCUMENTS 248240 12/1987 European Pat. Off. ............ 296/214
3442877 6/1986 Fed. Rep. of Germany ...... 296/214

Primary Examiner—Dennis H. Pedder
Attorney, Agent, or Firm—Foley & Lardner, Schwartz, Jeffery, Schwaab, Mack, Blumenthal & Evans

[57] ABSTRACT

In a motor vehicle having a sun roof construction wherein a guide rail for a sun roof lid extends along a sun roof opening and is secured to a fixed member of the vehicle, there is arranged a ceiling structure. The ceiling structure comprises a ceiling board having an opening which faces the sun roof opening, the ceiling board opening being thus bounded by a peripheral edge portion of the ceiling board; a flange portion integrally connected to the guide rail and having a plurality of cuts; a plurality of hook members fixed to the peripheral edge portion, each hook member having a pawl; and an elongate retainer having an engaging foot portion, wherein the hook members are passed through the cuts of the flange portion and projected outward from the flange portion, and the retainer is placed on the flange portion having the engaging foot portion engaged with the pawls of the hook members.

7 Claims, 2 Drawing Sheets

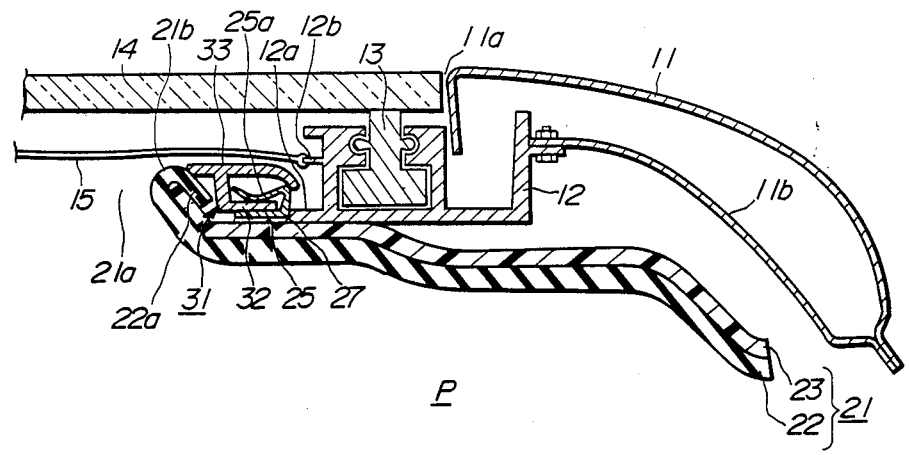
FIG. 1
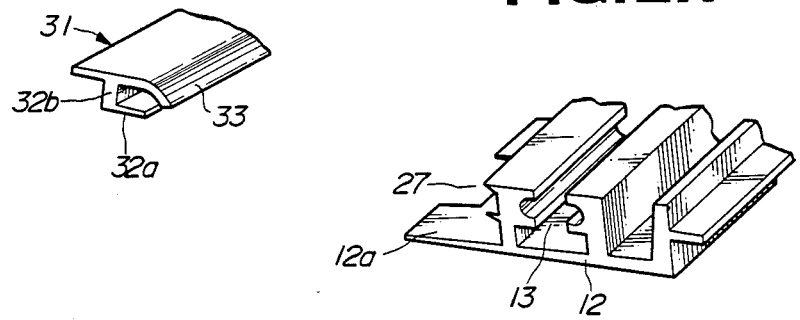
FIG. 2B
FIG. 2A
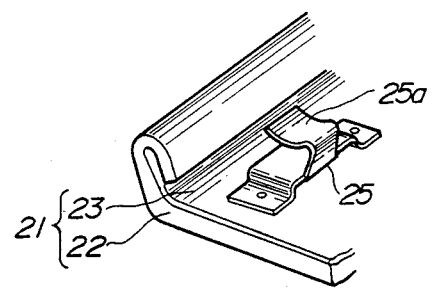
FIG. 2C

CEILING STRUCTURE OF MOTOR VEHICLE

BACKGROUND OF THE INVENTION

1. Field of the Invention

The present invention relates in general to ceiling structures of a passenger room of a motor vehicle, and more particularly to the ceiling structures of a type which is incorporated with a sun roof construction of the vehicle.

2. Description of the Prior Art

Nowadays, some passenger motor vehicles are equipped with a so-called "sun roof structure" which has a sun roof lid which can be slid or lifted open with respect to a sun roof opening formed in a roof panel of the vehicle. In the vehicles of this type, it is necessary to provide a ceiling board of a passenger room with an opening at a portion facing the sun roof opening of the roof panel. For fixing an edge portion of the ceiling board, by which the opening of the board is bounded, to given fixed members of the vehicle, various measures have been hitherto proposed and put into practical use.

In the following, one of the conventional measures will be outlined with reference to FIG. 3 of the accompanying drawings in order to clarify the task of the present invention.

Referring to the drawing which is a sectional, but partial, view taken from a direction parallel with a longitudinal axis of the associated vehicle, there is shown a conventional arrangement of a ceiling structure which is incorporated with a sun roof construction of a motor vehicle.

Designated by numeral 1 is a roof panel of the vehicle, which has a rectangular opening 1a formed therethrough. Slidably supported by the roof panel to open and close the rectangular opening 1a is a sun roof lid 4 which is constructed of a transparent material, such as glass panel, plastic panel or the like. The sun roof lid 4 has at its lateral sides respective sliders 3 which are slidably engaged with respective guide rails 2. Each guide rail 2 is secured to a fixed member of the vehicle and extends along the side edge of the opening 1a. The sun roof lid 4 is thus slidable forward to close the opening 1a and rearward to open the same.

Designated by numeral 5 is a ceiling board which is arranged below the roof panel 1 to constitute a ceiling of a passenger room P. The ceiling board 5 comprises a plastic base 6 and an outer decorative layer 7 bonded to the plastic base 6. As is understood from the drawing, the ceiling board 5 has a rectangular opening 5a which faces the opening 1a the sun roof construction. The edge portion 5b of the ceiling board 5, which bounds the opening 5a, is connected to a flange portion 2a of the guide rail 2 by means of a tubular holder or welt 8. Although not shown in the drawing, suitable known connectors are employed for tightly attaching the ceiling board 5 to the inner surface of the roof panel 1.

However, due to its inherency in construction, the above-mentioned ceiling structure has the following drawbacks.

First, because the gripping property of the tubular holder 8 is poor, it tends to occur that the ceiling board 5 is disconnected from the flange portion 2a of the guide rail 2.

Second, because of usage of the tubular holder 8, an unsightly groove 9 is inevitably produced on the edge portion 5b of the ceiling board 5, which extends along the tubular holder 8 as shown in the drawing. The groove 9 deteriorates the external appearance of the ceiling board 5.

Third, since the tubular holder 8 is exposed to the passenger room, the internal appearance of the room is considerably deteriorated.

SUMMARY OF THE INVENTION

It is therefore an object of the present invention to provide an improved ceiling structure, which is free of the above-mentioned drawbacks.

According to the present invention, there is provided, in a motor vehicle having a sun roof construction wherein a guide rail for a sun roof lid extends along a sun roof opening and is secured to a fixed member of the vehicle, an improved ceiling structure. The ceiling structure comprises a ceiling board having at a portion facing the sun roof opening an opening which is bounded by a peripheral edge portion of the ceiling board; a flange portion integrally connected to the guide rail and having a plurality of cuts; a plurality of hook members fixed to the peripheral edge portion, each hook member having a pawl; and an elongate retainer having an engaging foot portion, wherein the hook members are passed through the cuts of the flange portion and projected outward from the flange portion, and the retainer is placed on the flange portion having the engaging foot portion engaged with the pawls of the hook members.

BRIEF DESCRIPTION OF THE DRAWINGS

Other objects and advantages of the present invention will become apparent from the following description when taken in conjunction with the accompanying drawings, in which:

FIG. 1 is a sectional, but partial, view of a ceiling structure of the present invention, which is incorporated with a sun roof construction mounted on a roof panel of a motor vehicle;

FIG. 2A is a perspective but partial view of an end portion of a guide rail of the sun roof construction;

FIG. 2B is a perspective but partial view of an end portion of an elongate retainer employed in the invention;

FIG. 2C is a perspective but partial view of an end portion of a ceiling board employed in the invention.

DETAILED DESCRIPTION OF THE INVENTION

Figure 3:
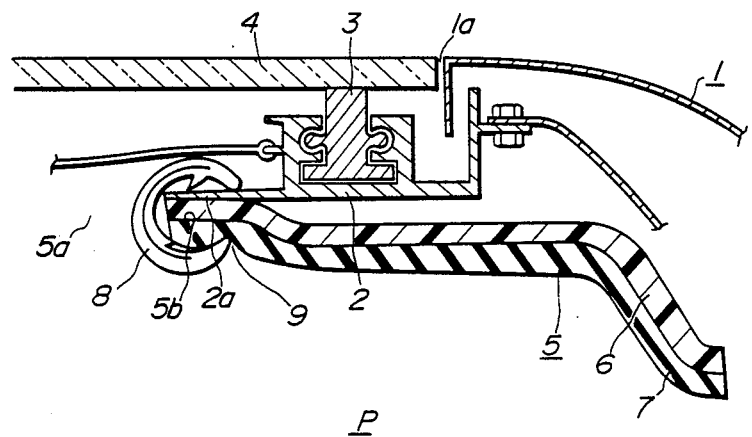
FIG. 3 is a view similar to FIG. 1, but showing a conventional ceiling structure incorporated with a sun roof construction.

Referring to FIGS. 1, 2A, 2B and 2C, particularly FIG. 1, there is shown a ceiling structure of the present invention, which is incorporated with a sun roof construction of a motor vehicle.

Similar to the above-mentioned construction of FIG. 3, the sun roof construction comprises a rectangular opening 11a formed in a roof panel 11 of the motor vehicle, a rectangular sun roof lid 14 constructed of a transparent material and a sliding mechanism for sliding the lid 14 between its open and close positions with respect to the opening 11a of the roof panel 11.

The sliding mechanism comprises sliders 13 (only one is shown) fixed to lateral sides of the sun roof lid 14 and slidably engaged with respective guide rails 12. Each guide rail 12 is secured to an inboard part 11b of the roof panel 11 and extends along the side edge of the opening 11a. The sun roof lid 14 is thus slidable forward to close the opening 11a and rearward to open the same. Designated by numeral 15 is a shading curtain which has each side slidably held by a thin rail 12b integrally formed on the guide rail 12. The curtain 15 is thus extendable to assume a position to cover the opening 11a. Under this, the light passing through the transparent lid 14 is shaded.

The ceiling structure of the invention comprises a ceiling board 21 which is arranged below the roof panel 11 to constitute a ceiling of a passenger room P. The ceiling board 21 comprises a plastic base plate 23 and a decorative layer 22 bonded to the base plate 23. The ceiling board 21 has a rectangular opening 21a which faces the opening 11a of the sun roof construction. As is best seen from FIG. 1, the edge portion of the base plate 23, which bounds the opening 21a, is covered with a folded back portion 22a of the decorative layer 22 for improving the appearance of the edge portion 21b of the ceiling board 21. For the purpose which will clarified hereinafter, the edge portion 21b is bent upward as shown.

The edge portion 21b of the ceiling board 21 detachably fixed to a flange portion 12a of the guide rail 12 in the manner as will be described in the following.

As is shown in FIG. 2C, a plurality of metal hook members 25 (only one is shown) are fixed to an upper side of the ceiling board 21 in a manner to align along the edge portion 21b of the board 21. Each hook member 25 has a pawl 25a directed toward the edge portion 21b. As is shown in FIG. 2A, the flange portion 12a of the guide rail 12 is formed with a plurality of cuts 27 which are so aligned and sized as to pass therethrough the hook members 25 upon fixing of the ceiling board 21 to the guide rail 12. Shown in FIG. 2B is an elongate retainer 31 which is constructed of a resilient material, such as steel, rigid plastic or the like. The retainer 31 comprises an engaging foot portion 32a, a leg portion 32b extending upward from the foot portion 32a and a concealing portion 33 formed on the leg portion 32. The concealing portion 33 has a considerable width for the purpose which will be clarified hereinafter.

For assembly, the edge portion 21b of the ceiling board 21 is pressed against the guide rail 12 having the hook members 25 passed through the corresponding cuts 27 of the flange portion 12a of the guide rail 12, and then the elongate retainer 31 is brought onto the flange portion 12a having the engaging foot portion 32a engaged with the pawls 25a of the hook members 25, as is seen from FIG. 1. Upon proper assembly, the concealing portion 33 of the retainer 31 conceals unsightly portions, such as the pawls 25a of the hook members 25, the cuts 27 of the flange portion 12a of the guide rail 12 and the folded back portion 22a of the decorative layer 22. Because the edge portion 21b of the ceiling board 21 is bent upward, the retainer 31 is not viewed from the passenger room P.

In the following, advantages of the present invention will be described.

First, because of the reliable retaining function of the retainer 31 in cooperation with the hook members 25, the ceiling board 21 can be tightly fixed to the flange portion 12a of the guide rail 12. Thus, the disconnection of the ceiling board 21 from the flange portion 12a does not occur.

Second, since the unsightly parts and portions are entirely concealed by the concealing portion of the retainer 31 and in addition to this, the retainer 31 per se is not viewed from the passenger room P, the appearance of the passenger room is improved.

What is claimed is:

1. In a motor vehicle having a sun roof construction wherein a guide rail for a sun roof lid extends along one side of a sun roof opening of the sun roof construction, said guide rail being secured to a fixed member of the vehicle, a combination comprising:
a ceiling board located below said sun roof construction and having an opening which faces said sun roof opening, each side of the ceiling board opening being thus bonded by a peripheral edge portion of said ceiling board;
a flange portion integrally connected to said guide rail and extending on a lateral side of said peripheral portion of said ceiling board, said flange portion being formed with a plurality of cuts;
a plurality of hook members fixed to said peripheral edge portion of the ceiling board each hook member having a pawl which projects upward through one of said cuts of said flange portion; and
an elongate retainer with an engaging foot portion being so arranged that the engaging foot portion is disposed between the pawl and a base portion of each hook member.

2. A sun roof construction as claimed in claim 1, in which said peripheral edge portion of the ceiling board is bent toward said retainer to conceal said retainer.

3. A sun roof construction as claimed in claim 2, in which said elongate retainer has further a concealing portion which, upon proper mounting of the retainer, conceals said hook members, said pawls, and said cuts.

4. A sun roof construction as claimed in claim 3, in which said retainer comprises the engaging foot portion, a leg portion extending upward from the foot portion, and the concealing portion formed on the leg portion.

5. A sun roof construction as claimed in claim 4, in which said retainer is constructed of a resilient material.

6. A sun roof construction as claimed in claim 2, in which said ceiling board comprises a plastic base plate and a decorative layer bonded to the base plate, and in which an edge portion of the base plate, which bounds the opening, is covered with a folded back portion of the decorative layer.

7. A sun roof construction as claimed in claim 6, in which said elongate retainer has further a concealing portion which, upon proper mounting of the retainer conceals said hook members, said pawls, said cuts, and said folded back portion.

* * * * *